United States Patent [19]

Eastman

[11] Patent Number: 4,634,596

[45] Date of Patent: Jan. 6, 1987

[54] COLD WATER SWELLING STARCH COMPOSITION

[75] Inventor: James E. Eastman, Decatur, Ill.

[73] Assignee: A. E. Staley Manufacturing Company, Decatur, Ill.

[21] Appl. No.: 780,047

[22] Filed: Sep. 25, 1985

[51] Int. Cl.⁴ ............................................. A23L 1/195
[52] U.S. Cl. .................................. 426/578; 426/579; 426/589; 426/661
[58] Field of Search ............... 426/578, 579, 658, 589, 426/661

[56] References Cited

U.S. PATENT DOCUMENTS

| | | | |
|---|---|---|---|
| 3,515,591 | 6/1970 | Feldman et al. | 424/579 |
| 3,583,874 | 6/1971 | Germino et al. | 426/579 |
| 3,914,456 | 10/1975 | Norsby et al. | 426/579 |
| 4,006,262 | 2/1977 | Smith et al. | 426/579 |
| 4,303,451 | 12/1981 | Seidel et al. | 426/579 |
| 4,504,512 | 3/1985 | Danielson | 426/579 |

*Primary Examiner*—Jeanette Hunter
*Attorney, Agent, or Firm*—Michael F. Campbell; James B. Guffey; Philip L. Bateman

[57] ABSTRACT

The subject invention relates to a cold water swelling starch composition which is comprised of a blend of at least two distinct starch components. One starch component is an essentially amylose free starch, while the other is a starch containing at least 20 percent amylose. The starch components are heat processed together under conditions that impart cold water swelling characteristics. The starch composition is useful in instant and convenience food formulations.

8 Claims, No Drawings

COLD WATER SWELLING STARCH COMPOSITION

FIELD OF THE INVENTION

The present invention relates to a cold water swelling starch composition which is comprised of at least two starches, one of which is essentially amylose free, which have been heat processed together. The invention also relates to processes for preparation of the cold water swelling starch and to the use of the resulting starch product in food systems, particularly instant foods which are prepared by the addition of hot liquids.

BACKGROUND OF THE INVENTION

It is well known that starches can be pregelled or precooked, dried and used in the preparation of instant food products. Traditional methods of preparing pregelatinized starches include drum drying, extrusion, and cooking followed by spray drying.

Other processes for production of instant starches include those described in:

Germino, U.S. Pat. No. 3,583,874 which discloses a starch composition suitable as a gelling agent in instant puddings which comprises a blend of pregelatinized, defatted starch and a granular preswollen starch having a water fluidity in a certain range.

Kuchinke, U.S. Pat. No. 3,332,785 which describes a cold setting pregelatinized starch material which is prepared by heating starch in an aqueous slurry with an organic carboxylic acid to 90° to 95° C. until the starch is completely gelatinized and thereafter spray drying the mixture.

Chiu, U.S. Pat. No. 4,228,199 which describes a chemically modified, pregelatinized, cold water dispersible gelling potato starch which is useful in preparing instant gelling food compositions. In the Chiu '199 patent, the modified potato starch is prepared by reacting a potato starch with a cross-linking agent to within defined Brabender Viscosity limits sufficient to provide the modified starch with gelling properties and thereafter drum drying the cross-linked starch to obtain the modified gelling potato starch product.

Chiu, U.S. Pat. Nos. 4,229,489 and 4,207,355 each describe cold water dispersible, gelling, chemically modified tapioca starch. The preparation of each of the disclosed gelling tapioca starches involves converting a tapioca starch to a specified water fluidity and reacting the starch with a cross-linking agent to within defined Brabender Viscosity limits. The modified tapioca starch described in the '489 patent is prepared by first reacting tapioca starch with cross-linking agent, acid converting the cross-linked starch and then drum drying the cross-linked and converted starch to provide a chemically modified, pregelatinized starch material with gelling properties.

In addition to the chemically modified, pregelatinized starches which have been developed for instant food systems, there is also disclosed in Mitchell, U.S. Pat. No. 4,260,642 the preparation of instant pudding starches through modification of a starch by forming an aqueous slurry containing an ungelatinized starch and an effective amount of sodium or calcium stearoyl-2-lactylate and heating the slurry to a temperature and for a period of time sufficient to gelatinize the starch. That patent discloses that the resultant modified starch possesses a smoother, creamier mouth-feel and higher sheen than does a starch pregelatinized without sodium or calcium stearoyl-2-lactylate. In one preferred embodiment of that invention, an aqueous slurry of ungelatinized starch is heated in the presence of calcium or sodium stearoyl-2-lactylate for a period of time sufficient to gelatinize the starch and to obtain whole granules uniformly swelled while minimizing bursting and undercooking of the starch granules and drying the slurry.

In view of recent trends and preference for the use of "natural" (not chemically modified) ingredients in food preparations, a starch composition which is unmodified by reaction with chemical modifiers or one which has been subjected to only a minimal amount of chemical modification or derivatization would offer several advantages for use in instant food systems. Not only would the cost of chemical modifying agents be eliminated or minimized but also there would be the inherent advantage perceived by the consumer of minimizing or eliminating the chemically modified starch ingredients in the many starch thickened food compositions which are included in the average consumer's diet.

With many instant food products, it is important to have rapid hydration or swelling of the starch granules.

Many pregelled or instant starches hydrate rapidly and acceptably in cold or cool water uses; however, when these starches are used with hot water or other hot liquids they tend to exhibit lumping of the starch and other ingredients. It is possible to reduce lumping of instant starch containing foods by screening the drum dried starches to obtain coarse particles. However, these products tend to be slow in hydrating and oftentimes fail to provide the desired effect, such as viscosity enhancement, for an instant food.

Accordingly, it is an object of the present invention to provide a cold water swelling starch composition which is useful as a thickening agent for instant food formulations.

It is a further object of the invention to provide a cold water swelling starch composition which is readily dispersible in hot liquids.

Another object is to provide a cold water swelling starch composition having little or no chemical substitution or modification which is readily dispersible in hot liquids.

Other objects and advantages of the invention will become apparent by reference to the following description.

Throughout the specification and claims all ratios and percentages are stated on a weight basis, temperatures are in degrees celsius and pressures are in KPascals over ambient unless otherwise indicated.

SUMMARY OF THE INVENTION

In one aspect the present invention is a cold water swelling starch composition comprised of a blend of at least two distinct starch components, wherein at least one starch component is essentially amylose free, the second starch component contains at least 20% amylose and wherein said starch components have been heat processed together under conditions which impart cold water swelling characteristics to said starch composition.

In another aspect, the present invention is embodied in an improved instant food composition in which the above-described starch composition is employed as a thickening agent.

DETAILED DESCRIPTION OF THE INVENTION

The cold water swelling starch composition of the present invention is derived from at least two sources of starch. The starch components are further characterized in that at least one component must be essentially amylose free, i.e., a waxy starch. The waxy component is a starch that consists essentially of amylopectin. The second starch component may be any starch that contains a significant amount of amylose, e.g., more than about 20 percent.

The first starch component that is primarily amylopectin is obtained from various "waxy" starch sources. Waxy starches include waxy maize, waxy sorghum (also known as waxy milo), waxy rice, etc. These starches are essentially amylose free in that they contain low levels of amylose, e.g., up to about 8%. This component may also include waxy starches which have been crosslinked or derivatized by chemical reactions used in the industry. A preferred waxy component is waxy maize starch.

The second starch component, or amylose containing component, designated as common starch, may be obtained from any starch source such as corn, wheat, arrowroot, potato, etc. These sources will typically contain 20 to 28 percent amylose and 72 to 80% amylopectin. Special mutant varieties of corn that contain higher levels of amylose are also useful in this invention. A preferred common starch component is corn starch.

The starting starch components are ungelatinized starches that are mixed together before being heat processed to impart cold water swelling characteristics. The waxy component comprises from about 15 percent to about 85 percent of the combined starch weight, while the common starch component comprises from about 15 percent to about 85 percent.

Cold water swelling starches are defined as starches which, when added to cold water, will rapidly disperse into water and swell to form a viscous paste.

The cold water swelling characteristics of the starch may be developed by treating the starch with any of the processes normally used to pregelatinize or impart cold water swelling properties. The starch material can be pregelatinized by drum drying, by cooking and spray drying or by extruding an aqueous slurry containing the blend of waxy and common starch components. These processes are defined as the aqueous process which impart cold water swelling characteristics to starch. In order to optimize the thickening characteristics of the starch composition processed by these processes, it is preferred that the waxy component comprise at least about 40 percent to about 85 percent, and most preferably 50 percent to about 80 percent of the starch blend. In extrusion or drum drying processes, the starch is slurried in water at a starch solids level of from about 30 percent to about 50 percent. The slurry is then heated at a temperature above the gelatinization temperature of the starch material. The temperature employed for cooking the starch slurry is generally above about 90° C. The starch may be cooked under pressure to gelatinize the starch. When the cooking and spray drying process is used to impart the cold water swelling properties to the starch, the starch blend is slurried in water at a solids level of from about 5 percent to about 20 percent starch. The slurry is then cooked at above 90° C. and spray dried.

A preferred process for imparting cold water solubility to the starch material hereof is the aqueous alcohol process described in U.S. Pat. No. 4,465,702. The cold water swelling starch material of the present invention is prepared by forming a slurry of a blend of the ungelatinized starches in an aqueous $C_1$-$C_3$ alkanol and heating that slurry in a confined zone to a temperature of about 148° to 182° C. for about 1 to 30 minutes and thereafter recovering the resulting cold water swelling starch product from the slurry. In order to optimize the dispersion and viscosity characteristics of the starch blend processed by the aqueous alcohol process, it is preferred that the waxy component comprises from about 20 percent to about 70 percent and most preferably from about 20 percent to about 40 percent of the starch material.

When subjected to the conditions of the foregoing processes ungelatinized starch materials which are normally characterized by little or no cold water swellability can be converted to a cold water swelling starch material. The ungelatinized starch starting material for the present process can be either chemically unmodified, i.e. not reacted with chemical modifiers, or modified chemically by reaction with various amounts of starch reactive chemical reagents such as oxidants, acids, etherifying and esterifying agents including crosslinking and substitution agents. As in the case of cook-up type starch materials, the functional properties of the present starch material varies with the nature and degree of chemical modification of the ungelatinized starch from which the starch material is prepared.

In a particularly preferred embodiment, the starch components employed herein as starting materials are not chemically modified and thereby yield a "natural" ingredient for use in instant food products.

The preparation of the present cold water swelling starch material by the aqueous alcohol process can be carried out as a batch-type process or as a continuous process. In either instance, the first step in carrying out the process is the preparation of a slurry comprised of about 10 to about 25 parts by weight dry substance basis (dsb) of an ungelatinized corn starch material in a liquid medium comprised of about 50 to about 75 parts by weight of an alcohol selected from methanol, ethanol, denatured ethanol, propanol and isopropanol and about 13 to about 30 parts by weight of water, provided that the liquid medium for the slurry contains about 15 to about 35% by weight of water inclusive of the water in the starch (i.e., the weight ratio of alcohol to water is about 5.7:1 to 1.9:1. Preferably the slurry is comprised of about 12 to about 20% by weight of starch (dsb) and about 17 to about 30% water.

In a preferred embodiment, ethanol or denatured ethanol is the preferred alcohol in the aqueous alcohol process.

The aforedescribed slurry of an ungelatinized starch material in an aqueous alcohol medium is heated to a temperature of about 148° to about 182° C. under autogenous pressure for about 30 seconds to about 30 minutes. The heating process can be conducted as a batch process in a sealed vessel or as a continuous or semi-continuous process by passing the slurry through a heated confined zone at a rate calculated to give a residence time for the slurry in the heated zone of about 30 seconds to about 30 minutes. Preferably the starch slurry is heated to a temperature of about 155° to 178° C. for a period of about 1 to about 10 minutes to convert the ungelatinized starch blend to the present cold water swelling starch. In a most preferred embodiment of the present process, the ungelatinized starch slurry contains about 12 to about 20% by weight of starch (dsb) and the liquid medium for the slurry contains about 18 to about 26% by weight of water (i.e., the weight ratio of alcohol to water is about 4.6:1 to 2.8:1); conversion of the ungelatinized starch to the present cold water swelling/soluble starch is accomplished by heating the slurry to a temperature of about 162° to about 172° C. for a period of about 2 to about 5 minutes.

After the heating step, the slurry is preferably cooled to below about 50° C. and the product cold water swelling starch is separated from the liquid medium component of the slurry by filtration or centrifugation. Following the recovery of the starch product from the reaction slurry, the starch is typically washed with 1 or more volumes of the alcohol used in the process, and dried and/or desolventized by conventional methods. For example, the starch can be dried in an oven to a certain volatiles level and then contacted with a hot humid gas, preferably moist air or steam, while the starch is maintained at a temperature from about 60° to about 120° C. for a time sufficient to reduce the alcohol content of the starch to a food acceptable level.

The cold water swelling starch composition of the present invention has application, either alone or in combination with other starch materials, as a thickening agent in both cooked and instant or convenience food formulations wherein a starch material is commonly used as the thickening agent (e.g., gravies, soups, sauces, dressings, hot beverage mixes and puddings). In one instance, for convenience food formulations utilizing the starch of the present invention, a mix is prepared containing starch, other nutritive ingredients, flavors, seasonings, etc. The mix is prepared as a dry or essentially dry food composition. The consumer prepares the convenience food for serving by admixing the starch containing dry food composition into water and heating or, in an especially preferred use of this invention, admixes the starch containing food composition with a preheated liquid such as water or milk, with stirring to disperse the dry food composition for serving.

It is preferred that the starch composition used as a thickening agent in instant food compositions be heat processed by using the aforedescribed aqueous alkanol process and be comprised of unmodified starch components. One convenient measure of the potential performance of starch compositions in which the aqueous alcohol process is used to impart cold water swelling characteristics is a cold water solubility test. When the starch composition is used in instant food compositions, it is preferred that the starch composition have a cold water solubility of at least about 40 percent, preferably at least about 50 percent and most preferably at least about 60 percent. The cold water solubility of the starch composition can be affected by various processing conditions including percentages of alcohol, the specific alcohol used, and water in the slurry composition and the reaction temperature. When the starch composition of the preferred embodiment is used as a thickening agent in instant food compositions which are prepared for consumption by adding hot liquids to the food composition, few, if any, visually noticeable lumps are formed. Rapid viscosity development is provided as the starch completely and quickly disperses in the liquid medium. Poor dispersing starches tend to quickly lump and, as a result, do not provide the needed viscosity.

Cold water solubility as used in characterizing the present cold water swelling starch material was carried out by specific procedure involving mixing a starch samples with water in a Waring blender; centrifuging the mixture, evaporating an aliquot of the supernatant liquid and weighing the residue as solubles. The equipment utilized in measuring cold-water solubility is as follows:

(1) Waring blender (Model PB5) equipped with semi-micro monel metal cup (Fisher Scientific Catalog No. 14-509-17);
(2) International Centrifuge Model K or similar;
(3) Centrifuge tubes, 100-ml, and evaporating dish; and
(4) Balance The cold water solubility measurement is carried out according to the following procedure:
1. Measure exactly 100-ml of distilled water at ambient temperature into the Waring blender cup.
2. Turn the blender on slow speed (about 6100 rpm) and add 1.000 gram of starch sample over less than a 15 second period, then stir for 2 minutes on high speed (about 13,500 rpm).
3. Fill a 100-ml centrifuge tube with the starch solution/suspension and centrifuge at maximum speed (3100 rpm is satisfactory) for 15 minutes.
4. Transfer a 25-ml aliquot of the supernatant to a tared evaporating dish and evaporate on a steam bath to apparent dryness.
5. Dry in an oven at 100° C. for at least 1 hour (overnight is satisfactory) and weigh.

Cold water solubility, expressed as percent water solubles (dsb), is then calculated according to the following formula:

$$\% \text{ water solubles } (dsb) = \frac{(\text{wt. of solids in 25 ml}) \times 4}{(\text{wt. of sample}) \times \frac{(100\% \text{ Moisture})}{100}} \times 100$$

A Brookfield viscosity test is used to determine the viscosity of the starch material. Viscosity is determined by heating 480±0.5 g. water to 85° C. in a 6-inch Sunbeam Mixmaster mixer bowl in a microwave oven. Immediately after heating this water, a starch/sugar blend is added to the water. The starch/sugar blend is made up of 25 g. dry solids (ds) starch and 50 g. of granulated sugar. The starch/sugar blend in water is mixed with a Sunbeam mixer at the Number 1 setting for 15 seconds; the sides of the bowl are scraped and the mixing continued at the Number 6 setting for 45 seconds. This mixture is poured into a 600 ml beaker and the viscosity is determined by measurement with a Brookfield viscometer. The tendency of the starch to form lumps is evaluated by visually evaluating the number of lumps in the starch/sugar/water blend prepared in the Brookfield viscosity test.

Having thus described the various embodiments of the present invention, the following examples are provided to more fully illustrate those embodiments, however, without limiting the invention to specific details of the examples.

EXAMPLE 1

A slurry comprising approximately 19.3 percent dry solids (d.s.) of starch material was prepared. The starch material was composed of 20 percent (d.s.b.) waxy maize starch and 80 (d.s.b.) percent common corn starch. The remainder of the slurry was composed of 60.9 percent anhydrous 3A ethanol and 19.8 percent water. The slurry was pumped through a tubular jacketed reactor under pressure at a temperature of 172° C. The residence time of the slurry in the reactor was about 2 minutes. The slurry was then cooled below 35° C. before venting to the atmosphere. The starch was centrifuged, dried and desolventized. The starch product had a cold water solubility of 67.7% and a Brookfield viscosity of 2065 cps. The starch did not lump when a sugar starch blend was dispersed into hot water.

EXAMPLE 2

A number of experiments were run to evaluate the effect of various ratios of waxy starch to common starch on the properties of the starch material as used in hot liquid. Various ratios of waxy and common starches were processed as in Example 1. Starch ratios, slurry composition and reaction temperatures and resulting cold-water solubilities and Brookfield viscosity values are shown in Table 1.

In this example, starch blends containing greater than 15% waxy component provided cold water swelling starch materials that readily dispersed in a hot liquid, provided the desired viscosity and had essentially no lump formation.

through a 20 mesh screen. The various drum dried starch compositions had properties as described in Table 2.

While the 100 percent waxy maize material had apparent acceptable viscosity formation and lack of lump formation, one skilled in the art would recognize that the use of the 100 percent waxy maize starch would impart an undesirable stringy texture to the food composition. On the other hand, the 100 percent common corn starch would not provide the desired viscosity to the food composition.

TABLE 2

| STARCH COMPOSITION | COLD WATER SOLUBILITY % | BROOKFIELD VISCOSITY (cps) | COMMENTS ON LUMPING TENDENCY |
|---|---|---|---|
| Waxy Maize 100% | 90.9 | 4550 | Essentially no lumps |
| Waxy Maize 75% Common Corn 25% | — | 4970 | Essentially no lumps |
| Waxy Maize 65% Common Corn 35% | — | 4825 | Essentially no lumps |
| Waxy Maize 50% Common Corn 50% | 83.9 | 3640 | Essentially no lumps |
| Waxy Maize 25% Common Corn 75% | — | 710 | Essentially no lumps |
| Common Corn 100% | 55.0 | 365 | Essentially no lumps |

The foregoing description and examples illustrate selected embodiments of the present invention and in light thereof, variations and modifications will be apparent to one skilled in the art all of which are within the spirit and purview of this invention.

What is claimed is:

1. A cold water swelling starch composition comprised of a blend of at least two distinct starch components, wherein one starch component is essentially amylose free, the second starch component containing at least 20 percent amylose, wherein said essentially amylose free starch component comprises from about 15 to about 85 percent of said starch composition, and wherein said starch components have been heat processed together in an aqueous $C_1$–$C_3$ alkanol medium at

TABLE I

| | | SLURRY COMPOSITION | | | REACTION TEMPERATURE °C. | COLD WATER SOLUBILITY % | BROOKFIELD VISCOSITY (cps) | COMMENTS ON LUMPING TENDENCY |
|---|---|---|---|---|---|---|---|---|
| RUN | TYPE OF STARCH | STARCH % | WATER % | ETHANOL 3A % | | | | |
| 1 | Waxy Maize 10% Common Corn 90% | 19.0 | 20.1 | 60.9 | 173 | 91.3 | 1180 | Many Lumps |
| 2 | Waxy Maize 15% Common Corn 85% | 19.0 | 20.1 | 60.9 | 173 | 92.3 | 1240 | Many Lumps |
| 3 | Waxy Maize 25% Common Corn 75% | 18.7 | 14.2 | 67.1 | 171 | 63.0 | 2180 | Essentially no Lumps |
| 4 | Waxy Maize 25% Common Corn 75% | 16.1 | 18.5 | 65.4 | 171 | 77.9 | 2100 | Essentially no Lumps |
| 5 | Waxy Maize 40% Common Corn 60% | 18.6 | 14.3 | 67.1 | 166 | 49.0 | 2430 | Essentially no Lumps |
| 6 | Waxy Maize 33⅓% Common Corn 67⅔% | 18.6 | 14.3 | 67.1 | 166 | 86.3 | 2350 | Essentially no Lumps |
| 7 | Common Corn 100% | 19.3 | 19.8 | 60.9 | 16.6 | 70.0 | 1220 | Many Lumps |
| 8 | Tapioca 100% | 19.2 | 19.0 | 61.8 | 16.6 | 92.1 | 700 | Many Lumps |

EXAMPLE 3

Various starch slurries containing different combinations of waxy maize and common corn starches were prepared at 30 to 35 percent dry solids (d.s.). The slurries were then drum dried on a laboratory scale Gouda drum dryer operated at 6 rpm and heated with saturated steam maintained at 170° C.±5° C. The dried starch was ground and screened so that all particles passed a temperature of about 148° to about 182° C. under autogenous pressure for about 30 seconds to about 30 minutes to impart cold water swelling characteristics.

2. A composition according to claim 1 wherein said essentially amylose free starch component is selected from the group comprising waxy maize starch, waxy sorghum starch and waxy rice starch.

3. A composition according to claim 2 wherein said essentially amylose free starch component is waxy maize starch.

4. A composition according to claim 1 wherein the second starch component is selected from the group consisting of corn starch, potato starch, tapioca starch, wheat starch and arrowroot starch.

5. A composition according to claim 1 wherein said starch blend is comprised of from about 20 to 70 percent amylose free starch.

6. A composition according to claim 1 wherein said starch components have not been chemically modified.

7. In an instant food composition wherein a starch material is used as a thickening agent, the improvement comprising the cold water swelling starch composition of claim 1.

8. The improved instant food composition of claim 7, wherein the starch thickening agent is a cold water swelling starch composition derived from starch components which have not been chemically modified.

* * * * *